US011172018B2

(12) United States Patent
Han et al.

(10) Patent No.: US 11,172,018 B2
(45) Date of Patent: Nov. 9, 2021

(54) METHOD AND APPARATUS FOR CONTROLLING TRAFFIC

(71) Applicant: Beijing Baidu Netcom Science and Technology Co., Ltd., Beijing (CN)

(72) Inventors: Chen Han, Beijing (CN); Liguo Duan, Beijing (CN); Meng Wang, Beijing (CN); Feifei Cao, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 84 days.

(21) Appl. No.: 16/675,722

(22) Filed: Nov. 6, 2019

(65) Prior Publication Data
US 2020/0274924 A1    Aug. 27, 2020

(30) Foreign Application Priority Data
Feb. 21, 2019    (CN) .......................... 201910130641.1

(51) Int. Cl.
*H04L 29/08* (2006.01)
(52) U.S. Cl.
CPC ................................ *H04L 67/1012* (2013.01)
(58) Field of Classification Search
CPC .................................................. H04L 67/1012
See application file for complete search history.

(56) References Cited

U.S. PATENT DOCUMENTS

| | | | | |
|---|---|---|---|---|
| 9,800,517 | B1* | 10/2017 | Anderson | H04L 47/70 |
| 2006/0265738 | A1* | 11/2006 | Chrysanthakopoulos | G06F 1/10 726/3 |
| 2014/0298091 | A1* | 10/2014 | Carlen | G06F 9/54 714/15 |
| 2018/0375762 | A1* | 12/2018 | Bansal | H04L 61/251 |
| 2019/0042527 | A1* | 2/2019 | Langer | H04L 45/04 |
| 2019/0349426 | A1* | 11/2019 | Smith | H04L 45/20 |

FOREIGN PATENT DOCUMENTS

| | | |
|---|---|---|
| JP | 2003-060691 A | 2/2003 |
| JP | 2011-113230 A | 6/2011 |
| WO | WO 2017/217988 A1 | 12/2017 |

\* cited by examiner

*Primary Examiner* — Duc C Ho
(74) *Attorney, Agent, or Firm* — Nixon Peabody LLP (57) ABSTRACT

Embodiments of the present disclosure relate to a method and apparatus for controlling traffic. A method may include: acquiring node identifiers of a plurality of traffic control nodes in a distributed system and a resource identifier of at least one kind of resource controlled by the distributed system; determining, according to the identifiers and at least one resource identifier, at least one traffic control node for controlling the at least one kind of resource in the distributed system being a resource control node; acquiring a configuration quota of the at least one kind of resource; and sending at least one configuration quota to a resource control node controlling a corresponding resource, for the resource control node to determine control quotas for the traffic control nodes in the distributed system.

20 Claims, 7 Drawing Sheets

METHOD AND APPARATUS FOR CONTROLLING TRAFFIC

This application claims priority to Chinese Patent Application No. 201910130641.1, filed on Feb. 21, 2019, titled "Method and apparatus for controlling traffic," which is hereby incorporated by reference in its entirety.

TECHNICAL FIELD

Embodiments of the present disclosure relate to the field of computer technology, and specifically to a method and apparatus for controlling traffic.

BACKGROUND

In the process of network communication, in order to make limited network resources work better, and avoid a network congestion caused by a large amount of bursting data of users, it is required to control the traffic of the users. In order to achieve effective utilization of the resources and improve the utilization rate of the resources, a reasonable traffic control scheme is urgently required for a many-to-one distributed networking environment.

SUMMARY

Embodiments of the present disclosure provide a method and apparatus for controlling traffic.

In a first aspect, an embodiment of the present disclosure provides a method for controlling traffic, applied to a management node in a distributed system, the distributed system further comprising a plurality of traffic control nodes, and the method including: acquiring node identifiers of the plurality of traffic control nodes in the distributed system and a resource identifier of at least one kind of resource controlled by the distributed system; determining, according to the node identifiers and at least one resource identifier, at least one traffic control node for controlling the at least one kind of resource in the distributed system being a resource control node; acquiring a configuration quota of the at least one kind of resource; and sending at least one configuration quota to a resource control node controlling a corresponding resource, for the resource control node to determine control quotas for the traffic control nodes in the distributed system.

In some embodiments, the acquiring node identifiers of the plurality of traffic control nodes in the distributed system includes: acquiring, in response to receiving a node number change message, the node identifiers of the plurality of traffic control nodes in the distributed system.

In some embodiments, the method further includes: determining, in response to receiving a load imbalance message, a resource identifier included in the load imbalance message; acquiring usage quotas of the plurality of traffic control nodes in the distributed system for a resource indicated by the determined resource identifier; and sending the acquired usage quotas to a resource control node controlling the resource indicated by the determined resource identifier, for the resource control node to adjust the control quotas.

In a second aspect, an embodiment of the present disclosure provides a method for controlling traffic, applied to a resource control node in a distributed system, the distributed system comprising a management node and a plurality of traffic control nodes, the resource control node referring to a traffic control node for controlling at least one kind of resource in the plurality of traffic control nodes, and the method including: receiving a resource identifier and a corresponding configuration quota; acquiring a first number of the traffic control nodes in the distributed system and node identifiers of the traffic control nodes; determining control quotas of the traffic control nodes in the distributed system according to the configuration quota and the first number; generating resource control data according to the resource identifier, the node identifiers of the traffic control nodes in the distributed system and the control quotas; and synchronizing the generated resource control data to at least one traffic control node.

In some embodiments, the method further includes: adjusting, in response to receiving usage quotas of the traffic control nodes in the distributed system for a resource, the control quotas of the traffic control nodes in the distributed system according to the received usage quotas and the control quotas of the traffic control nodes; and generating updated resource control data according to the resource identifier, the node identifiers of the traffic control nodes in the distributed system and the adjusted control quotas.

In some embodiments, the method further includes: generating a data version number of the resource control data. The synchronizing the generated resource control data to at least one traffic control node includes: synchronizing the generated resource control data and the data version number to the at least one traffic control node.

In some embodiments, the method further includes: receiving the resource control data and the data version number; and storing locally the received resource control data and the received data version number, to determine a newest version of resource control data according to the data version number when a request is received, and to process the request according to the newest version of resource control data.

In some embodiments, synchronizing the generated resource control data to the at least one traffic control node includes: dividing the generated resource control data into at least one data block according to a preset data block length; calculating a checksum of a data block in the at least one data block to obtain a checksum list; sending the checksum list to the at least one traffic control node, to cause the at least one traffic control node to determine incremental data according to the checksum list; and sending the incremental data to the at least one traffic control node to complete the synchronization.

In a third aspect, an embodiment of the present disclosure provides an apparatus for controlling traffic, arranged in a management node in a distributed system, the distributed system further comprising a plurality of traffic control nodes, and the apparatus including: a first acquiring unit, configured to acquire node identifiers of the plurality of traffic control nodes in the distributed system and a resource identifier of at least one kind of resource controlled by the distributed system; a control node determining unit, configured to determine, according to the node identifiers and at least one resource identifier, at least one traffic control node for controlling the at least one kind of resource in the distributed system being a resource control node; a second acquiring unit, configured to acquire a configuration quota of the at least one kind of resource; and a first information sending unit, configured to send at least one configuration quota to a resource control node controlling a corresponding resource, for the resource control node to determine control quotas for the traffic control nodes in the distributed system.

In some embodiments, the first acquiring unit is further configured to: acquire, in response to receiving a node number change message, the node identifiers of the plurality of traffic control nodes in the distributed system.

In some embodiments, the apparatus further includes: a resource identifier determining unit, configured to determine, in response to receiving a load imbalance message, a resource identifier included in the load imbalance message; a usage quota acquiring unit, configured to acquire usage quotas of the plurality of traffic control nodes in the distributed system for a resource indicated by the determined resource identifier; and a second information sending unit, configured to send the acquired usage quotas to a resource control node controlling the resource indicated by the determined resource identifier, for the resource control node to adjust the control quotas.

In a fourth aspect, an embodiment of the present disclosure provides an apparatus for controlling traffic, arranged in a resource control node in a distributed system, the distributed system comprising a management node and a plurality of traffic control nodes, the resource control node referring to a traffic control node for controlling at least one kind of resource in the plurality of traffic control nodes, and the apparatus including: a first receiving unit, configured to receive a resource identifier and a corresponding configuration quota; a third acquiring unit, configured to acquire a first number of the traffic control nodes in the distributed system and node identifiers of the traffic control nodes; a control quota determining unit, configured to determine control quotas of the traffic control nodes in the distributed system according to the configuration quota and the first number; a control data generating unit, configured to generate resource control data according to the resource identifier, the node identifiers of the traffic control nodes in the distributed system and the control quotas; and a control data synchronizing unit, configured to synchronize the generated resource control data to at least one traffic control node.

In some embodiments, the apparatus further includes: a control quota adjusting unit, configured to adjust, in response to receiving usage quotas of the traffic control nodes in the distributed system for a resource, the control quotas of the traffic control nodes in the distributed system according to the received usage quotas and the control quotas of the traffic control nodes; and a control data updating unit, configured to generate updated resource control data according to the resource identifier, the node identifiers of the traffic control nodes in the distributed system and the adjusted control quotas.

In some embodiments, the apparatus further includes: a version number generating unit, configured to generate a data version number of the resource control data. The control data synchronizing unit is further configured to: synchronize the generated resource control data and the data version number to the at least one traffic control node.

In some embodiments, the apparatus further includes: a second receiving unit, configured to receive the resource control data and the data version number; and a storing unit, configured to store locally the received resource control data and the received data version number, to determine a newest version of resource control data according to the data version number when a request is received, and to process the request according to the newest version of resource control data.

In some embodiments, the control data synchronizing unit is further configured to: divide the generated resource control data into at least one data block according to a preset data block length; calculate a checksum of a data block in the at least one data block to obtain a checksum list; send the checksum list to the at least one traffic control node, to cause the at least one traffic control node to determine incremental data according to the checksum list; and send the incremental data to the at least one traffic control node to complete the synchronization.

In a fifth aspect, an embodiment of the present disclosure provides a server, including: one or more processors; and a storage device, configured to store one or more programs, where the one or more programs, when executed by the one or more processors, cause the one or more processors to implement the method according to any embodiment in the first aspect.

In a sixth aspect, an embodiment of the present disclosure provides a server, including: one or more processors; and a storage device, configured to store one or more programs, where the one or more programs, when executed by the one or more processors, cause the one or more processors to implement the method according to any embodiment in the second aspect.

In a seventh aspect, an embodiment of the present disclosure provides a computer readable medium, storing a computer program, where the program, when executed by a processor, implements the method according to any embodiment in the first aspect.

In an eighth aspect, an embodiment of the present disclosure provides a computer readable medium, storing a computer program, where the program, when executed by a processor, implements the method according to any embodiment in the second aspect.

According to the method and apparatus for controlling traffic provided by the embodiments of the present disclosure, for the management node, it may first acquire the node identifier of each traffic control node in the distributed system and the resource identifier of each resource; then, determine, according to the each node identifier and the each resource identifier, that the each traffic control node for controlling the each resource is the resource control node; then, acquire the configuration quota of the each resource; and finally, send each configuration quota to each resource control node, for the resource control node to determine a control quota for the each traffic control node in the distributed system. For the resource control node in the distributed system, it may first receive the resource identifier and the corresponding configuration quota; then, acquire the first number of the traffic control nodes in the distributed system and the node identifier of the each traffic control node; next, determine, according to the configuration quota and the first number, the control quota of the each traffic control node; generate the resource control data according to the resource identifier, the node identifier of the each traffic control node and the each control quota; and finally, synchronize the generated resource control data to the at least one traffic control node. Through the method of the embodiments, the traffic control on various kinds of resources may be implemented.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail by combining the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
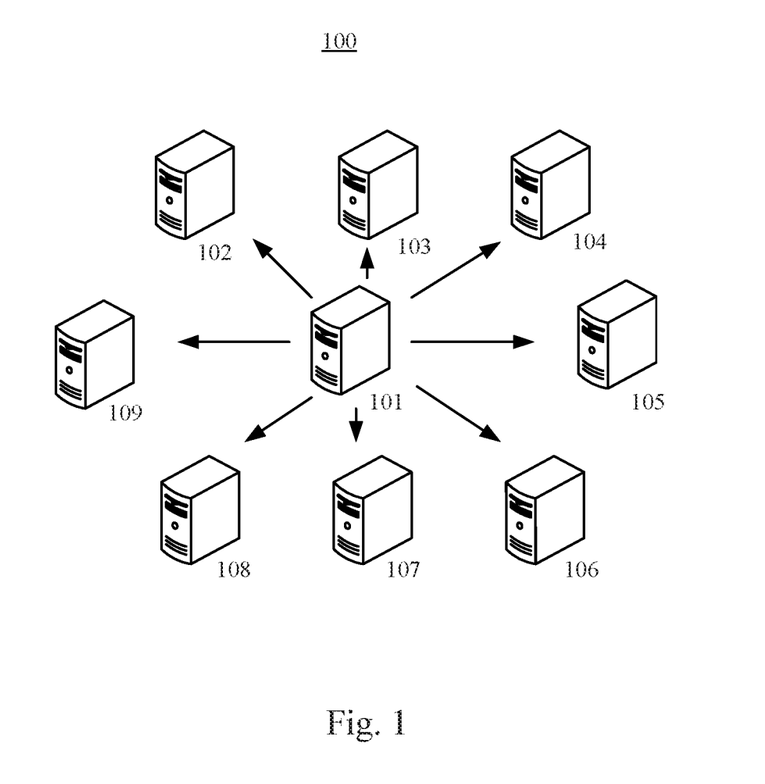
FIG. 1 is a diagram of an exemplary system architecture in which embodiments of the present disclosure may be applied.

FIG. 1 shows an exemplary system architecture 100 in which a method for controlling traffic or an apparatus for controlling traffic according to the embodiments of the present disclosure may be applied.

As shown in FIG. 1, the system architecture 100 may be a distributed system, which may include a management node 101 and traffic control nodes 102-109. The nodes may communicate with each other through a network. The network may include various types of connections, for example, wired or wireless communication links, or optical fiber cables. The distributed system may perform a traffic control on at least one kind of resource, and the resource herein refers to computing resources, for example, networks, bandwidths and memories.

The management node 101 may determine that a node in traffic control nodes 102-109 that performs the traffic control on each resource is a resource control node. One resource control node performs the traffic control on at least one kind of resource. It may be appreciated that a resource control node refers to one or more nodes in the traffic control nodes 102-109. The resource control node itself is both the manager of the resource and the consumer of the resource.

The resource control node may allocate a control quota of the resource to the traffic control nodes 102-109, such that each of the traffic control nodes 102-109 processes a request according to its control quota. The resource control node may allocate the control quota to other traffic control nodes, or may receive a control quota allocated by other resource control nodes.

A user may interact with the nodes 102-109 in the distributed system using a terminal device (not shown in the drawings), to receive or send messages. Various communication client applications (e.g., a webpage browser application, a shopping application, a search application, an instant communication tool, a mailbox client and social platform software) may be installed on the terminal device.

The management node 101 may be a node managing the traffic control nodes 102-109, which may send various messages to the resource control node in the traffic control nodes 102-109, to cause the resource control node to determine the control quota.

It should be noted that each node in the distributed system may be hardware or software.

Figure 2:
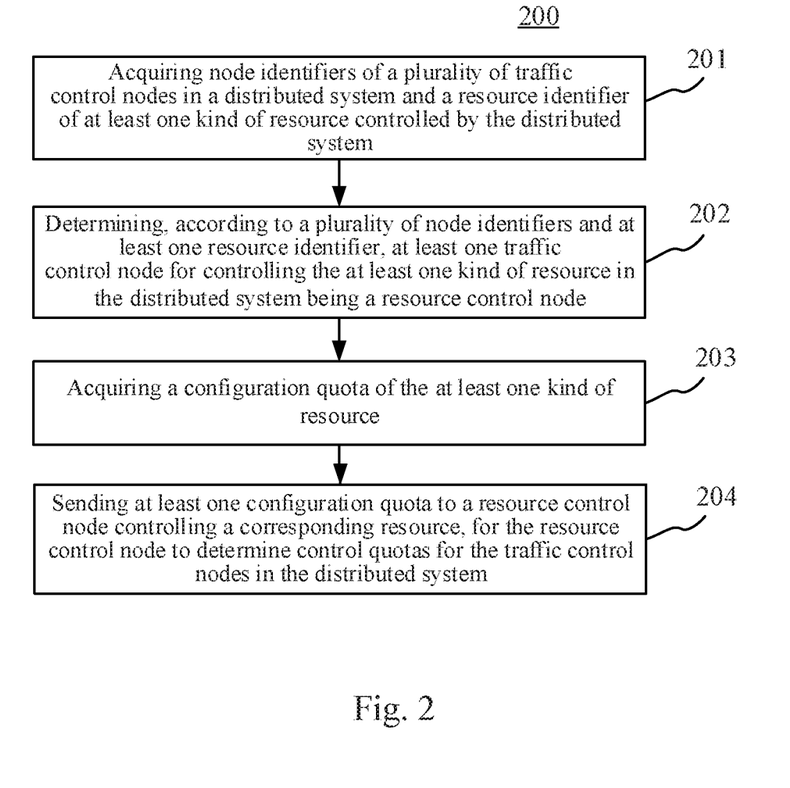
FIG. 2 is a flowchart of a method for controlling traffic according to an embodiment of the present disclosure.
Figure 4:
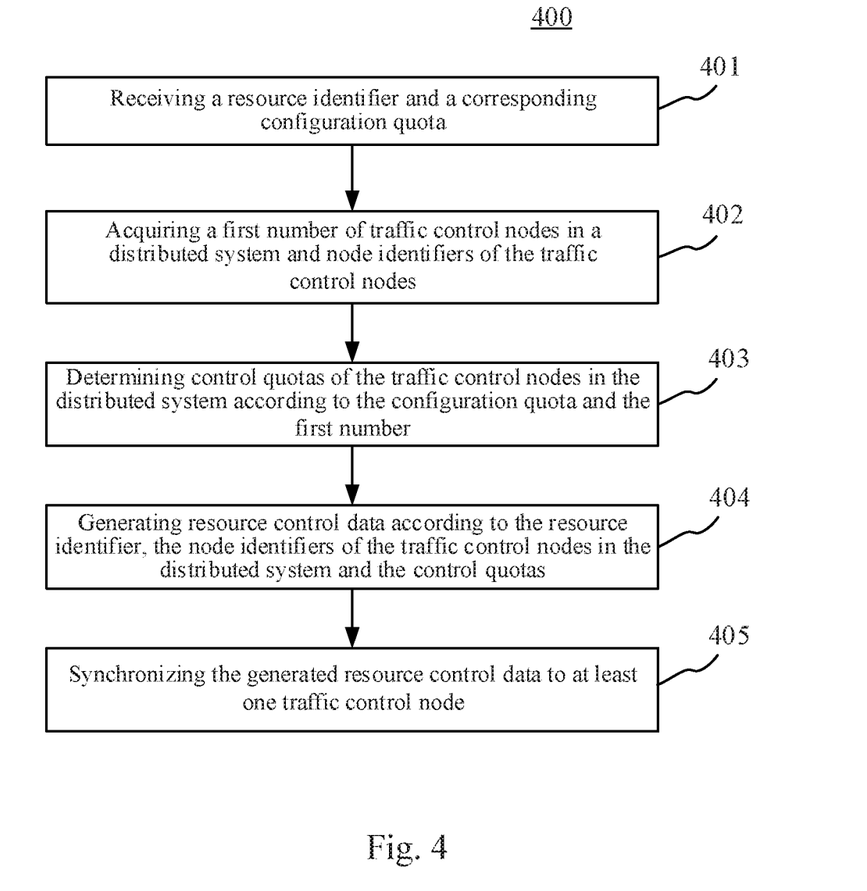
FIG. 4 is a flowchart of the method for controlling traffic according to another embodiment of the present disclosure.
Figure 6:
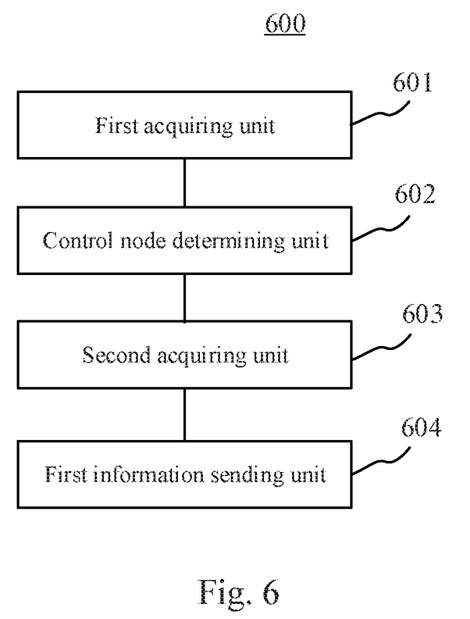
FIG. 6 is a schematic structural diagram of an apparatus for controlling traffic according to an embodiment of the present disclosure.
Figure 7:
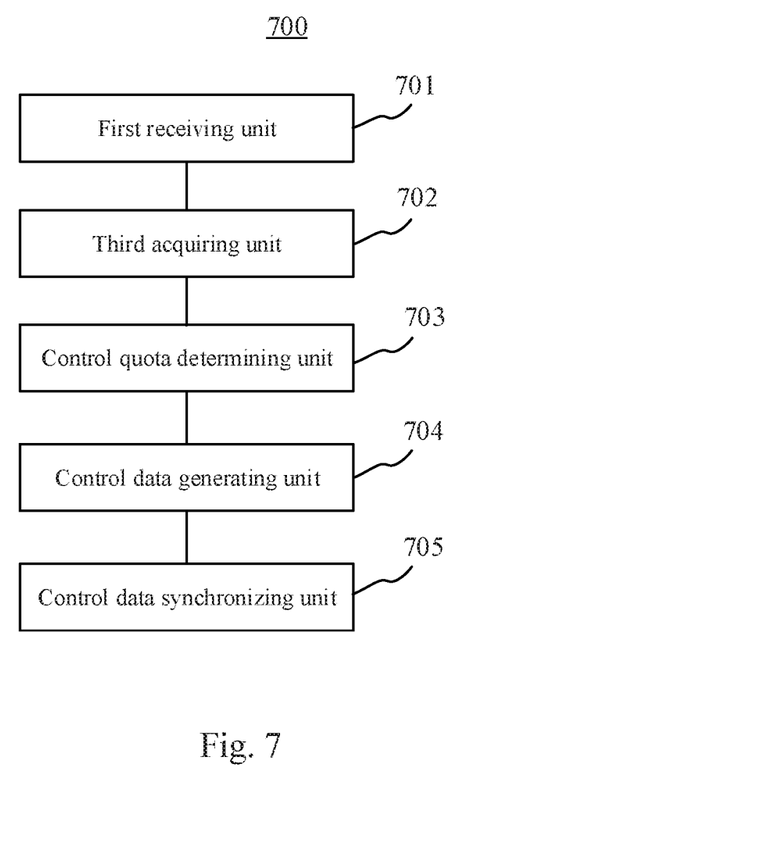
FIG. 7 is a schematic structural diagram of the apparatus for controlling traffic according to another embodiment of the present disclosure.

In the present disclosure, the method for controlling traffic provided by the embodiment shown in FIG. 2 is generally performed by the management node 101 in the distributed system, and the method for controlling traffic provided by the embodiment shown in FIG. 4 is generally performed by the resource control node in the distributed system. Correspondingly, the apparatus for controlling traffic shown in FIG. 6 is generally provided in the management node 101, and the apparatus for controlling traffic shown in FIG. 7 is generally provided in the resource control node.

It should be appreciated that the numbers of the management nodes and the traffic control nodes in FIG. 1 are merely illustrative. Any number of management nodes and traffic control nodes may be provided based on actual requirements.

Further referring to FIG. 2, FIG. 2 illustrates a flow 200 of a method for controlling traffic according to an embodiment of the present disclosure. The method for controlling traffic in this embodiment may be applied to a management node in a distributed system. The distributed system may further include a plurality of traffic control nodes, and the plurality of traffic control nodes further include at least one resource control node for controlling a resource. The method includes the following steps.

Step 201, acquiring node identifiers of a plurality of traffic control nodes in a distributed system and a resource identifier of at least one kind of resource controlled by the distributed system.

In this embodiment, an executing body (e.g., the management node 101 shown in FIG. 1) of the method for controlling traffic may acquire, by means of a wired connection or a wireless connection, the node identifiers of the plurality of traffic control nodes in the distributed system and the resource identifier of the at least one kind of resource controlled by the distributed system. The plurality of traffic control nodes may refer to traffic control nodes (e.g., the traffic control nodes 102-109 shown in FIG. 1) in the distributed system, and the resources may refer to various computing resources, for example, bandwidths, databases and magnetic disks. The management node may locally acquire the node identifier of each traffic control node and the resource identifier of each resource. Alternatively, the management node may acquire the node identifier of the each traffic control node and the resource identifier of the each resource from other devices.

It should be noted that the wireless connection may include, but not limited to a 3G/4G connection, a WiFi connection, a Bluetooth connection, a WiMAX connection, a Zigbee connection, a UWB (ultra wideband) connection, and other wireless connections now known or developed in the future.

In some alternative implementations of this embodiment, the management node may acquire the node identifiers of the plurality of traffic control nodes in the distributed system and the resource identifier of the at least one kind of resource controlled by the distributed system at an interval of a preset time length.

In some alternative implementations of this embodiment, the management node may acquire the node identifiers of the plurality of traffic control nodes in the distributed system each time that a node number change message is received.

In this implementation, the node number change message is used to prompt the management node that the number of the traffic control nodes (i.e., the topology structure) in the distributed system changes. In order to respond to the change of the topology structure of the distributed system in time, the management node may actively acquire the node identifiers of the plurality of traffic control nodes in the distributed system when receiving the node number change message. In this way, the resource control node may re-determine the control quota of the each traffic control node, to avoid that a newly added node cannot perform a traffic control, or that a deleted node still occupies the control quota.

Step 202, determining, according to a plurality of node identifiers and at least one resource identifier, at least one traffic control node for controlling the at least one kind of resource in the distributed system being a resource control node.

In this embodiment, after acquiring the node identifiers and the resource identifier, the management node may allocate at least one node identifier to each resource identifier. In this way, the corresponding relationship between the resource identifier and the node identifier may be determined, and thus the traffic control node controlling each resource may be determined. Here, the traffic control node for controlling the resource is referred to as the resource control node.

In some alternative implementations of this embodiment, the management node may randomly match a node identifier with a resource identifier, such that one node identifier corresponds to one resource identifier. In this way, it may be achieved that one resource control node controls one kind of resource.

In some alternative implementations of this embodiment, the management node may respectively perform a hash calculation on the node identifiers and the resource identifier. Then, the node identifier and the resource identifier having the same hash value correspond to each other. In this way, a resource control node controlling a certain resource may be quickly determined through the hash calculation.

It may be understood that when the number of the traffic control nodes in the distributed system changes, the corresponding relationship between the resource control node and the resource may also change.

Step 203, acquiring a configuration quota of the at least one kind of resource.

In this embodiment, the management node may further acquire the configuration quota of each resource. The management node may acquire the configuration quota in various ways. For example, the management node may determine the configuration quota of the each resource by analyzing the configuring file. Alternatively, the management node may receive the configuration quota of the each resource inputted by a user through a terminal. The configuration quota is used to represent the total quota of the traffic control, which is performed on the resource, in the distributed system.

Step 204, sending at least one configuration quota to a resource control node controlling a corresponding resource, for the resource control node to determine control quotas for the traffic control nodes in the distributed system.

After acquiring the configuration quota of the each resource, the management node may send the configuration quota to the resource control node controlling the resource. After receiving the configuration quota, the resource control node may determine the control quota for the each traffic control node in the distributed system. The control quota is used to represent the quota when the traffic control node performs the traffic control. When the sum of the traffic consumed by the received request is greater than the control quota, the processing of the request may be rejected.

In some alternative implementations of this embodiment, the method may further include the following steps not shown in FIG. 2: determining, in response to receiving a load imbalance message, a resource identifier included in the load imbalance message; acquiring usage quotas of the plurality of traffic control nodes in the distributed system for a resource indicated by the determined resource identifier; and sending the acquired usage quotas to a resource control node controlling the resource indicated by the determined resource identifier, for the resource control node to adjust the control quotas.

In this implementation, the management node may further receive the load imbalance message, the load imbalance message is used to prompt the management node that the control quota arranged for a certain resource is unreasonable. The load imbalance message includes a resource identifier. In the distributed system, it is possible that the usage quota of a certain traffic control node for the resource is equal to the control quota. Alternatively, it is possible that the usage quota of the certain traffic control node for the resource is much less than the control quota. The usage quota refers to the quota of the resource used by the traffic control node. At this point, there is a situation where the load is unbalanced. The control quota of the each traffic control node should be adjusted appropriately. The purpose of the adjustment is to make the control quota of the traffic control node having a large usage quota larger, and make the control quota of the traffic control node having a small usage quota smaller.

After receiving the load imbalance message, the management node may first determine the resource identifier included in the load imbalance message. Then, the usage quotas of the plurality of traffic control nodes in the distributed system for the resource indicated by the resource identifier are acquired. The management node may send the usage quotas to the resource control node controlling the corresponding resource, for the resource control node to adjust the determined control quotas according to the usage quotas.

Figure 3:
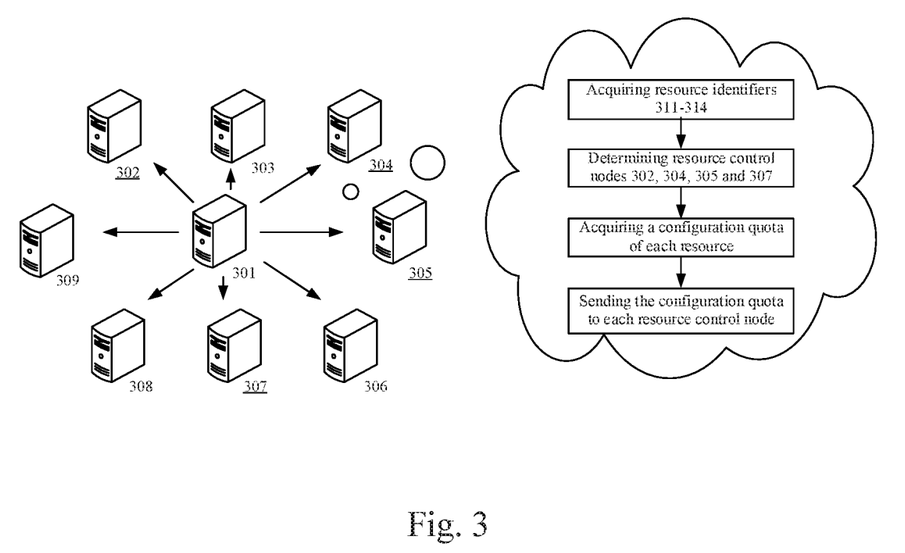
FIG. 3 is a schematic diagram of an application scenario of the method for controlling traffic according to an embodiment of the present disclosure.

Further referring to FIG. 3, FIG. 3 is a schematic diagram of an application scenario of the method for controlling traffic according to this embodiment. In the application scenario of FIG. 3, the management node 301 first acquires the node identifiers 302-309 of the plurality of traffic control nodes in each distributed system. Then, the resource identifiers 311-314 of the resources controlled by the distributed system are acquired. The management node 301 determines that the resource control nodes for controlling the resources in the traffic control nodes are respectively 302, 304, 305 and 307. Here, the traffic control node 302 is used to control the resource 311, the traffic control node 304 is used to control the resource 312, the traffic control node 305 is used to control the resource 313, and the traffic control node 307 is used to control the resource 314. Then, the management node 301 acquires the configuration quotas of the resources. Finally, the management node 301 sends the configuration quota of the resource 311 to the traffic control node 302, sends the configuration quota of the resource 312 to the traffic control node 304, sends the configuration quota of the resource 313 to the traffic control node 305, and sends the configuration quota of the resource 314 to the traffic control node 307. After the resource control nodes 302, 304, 305 and 307 receive the configuration quotas, the resource control nodes 302, 304, 305 and 307 determines the control quotas for the traffic control nodes 302-309.

According to the method for controlling traffic provided by the above embodiment of the present disclosure, the node identifier of the each traffic control node in the distributed system and the resource identifier of the each resource may first be acquired. Then, according to the each node identifier and the each resource identifier, it is determined that the each traffic control node for controlling the each resource is the resource control node. Then, the configuration quota of the each resource is acquired. Finally, each configuration quota is sent to the each resource control node, for the resource control node to determine the control quota for the each traffic control node in the distributed system. According to the method in this embodiment, the resource control node may be determined for the each resource, thus implementing the traffic control on various kinds of resources.

Further referring to FIG. 4, FIG. 4 illustrates a flow 400 of the method for controlling traffic according to another embodiment of the present disclosure. The method for controlling traffic in this embodiment may be applied to a resource control node in a distributed system, and this embodiment is described with the resource control node as a resource controller. The distributed system may include a management node and a plurality of traffic control nodes. Here, the resource control node refers to a node for controlling a resource in the traffic control nodes. As shown in FIG. 4, the method in this embodiment includes the following steps.

Step 401, receiving a resource identifier and a corresponding configuration quota.

In this embodiment, an executing body (e.g., the resource control node in the distributed system) of the method for controlling traffic may receive the resource identifier and the corresponding configuration quota from the management node by means of a wired connection or a wireless connection. Here, the resource identifier is used to represent the resource required to be controlled by the resource control node, and the configuration quota is used to represent the total quota of the control performed on the resource in the distributed system.

Step 402, acquiring a first number of the traffic control nodes in the distributed system and node identifiers of the traffic control nodes.

The resource control node may further acquire the first number of the traffic control nodes in the distributed system and the node identifiers of the traffic control nodes. Specifically, the resource control node may acquire the first number and the node identifiers from the management node.

Step 403, determining control quotas of the traffic control nodes in the distributed system according to the configuration quota and the first number.

After acquiring the configuration quota and the first number, the resource control node may determine the control quota of each traffic control node in the distributed system. Specifically, the resource control node may use the quotient of the configuration quota and the first number as the control quota of the each traffic control node.

In some alternative implementations of this embodiment, the resource control node may further generate control quotas of different time lengths according to the control quotas. For example, the resource control node may generate a control quota per second, a control quota per hour, a daily control quota or an N-day control quota, and thus traffic controls of different dimensions may be implemented.

Step 404, generating resource control data according to the resource identifier, the node identifiers of the traffic control nodes in the distributed system and the control quotas.

After determining the control quotas of the traffic control nodes, the resource control node may generate the resource control data by combining the resource identifier and the node identifiers of the traffic control nodes in the distributed system. The resource control data may refer to a list, including the control quotas of the traffic control nodes for the resource indicated by the resource identifier.

In some alternative implementations of this embodiment, when or after generating the resource control data, the resource control node may further generate the data version number of the resource control data. The data version number may be used to represent the time at which the resource control data is generated, the validity of the resource control data, or the like. It may be understood that the newest version of resource control data shall prevail when the each traffic control node controls the traffic according to the resource control data.

Step 405, synchronizing the generated resource control data to at least one traffic control node.

The resource control node may synchronize the generated resource control data to the at least one traffic control node. Specifically, the resource control node may continue synchronizing the resource control data to other traffic control nodes based on a gossip algorithm. That is, the resource control node may directly send the obtained resource control data to three traffic control nodes communicating with each other. Then, the three traffic control nodes receiving the resource control data may continue to send the resource control data to other three traffic control nodes other than the senders. Therefore, the propagation of the resource control data in the distributed system may be realized, and at the same time, a network storm may be avoided. The gossip algorithm (also known as an anti-entropy algorithm) is characterized in that in a bounded network, each node randomly communicates with other nodes, and the states of all the nodes will be consistent after the disordered communication.

In some alternative implementations of this embodiment, the method may further include the following steps not shown in FIG. 4: adjusting, in response to receiving usage quotas of the traffic control nodes in the distributed system for a resource, the control quotas of the traffic control nodes in the distributed system according to the received usage quotas and the control quotas of the traffic control nodes; and generating updated resource control data according to the resource identifier, the node identifiers of the traffic control nodes in the distributed system and the adjusted control quotas.

In this implementation, the resource control node may receive, from the management node, the usage quotas of the traffic control nodes in the distributed system. After the usage quotas are received, the control quotas of the traffic control nodes in the distributed system may be adjusted in combination with the control quotas of the traffic control nodes. Specifically, the resource control node may first calculate the usage rate of each traffic control node for the resource according to the usage quota and the control quota of the each traffic control node. Then, the usage rate is compared with a first preset threshold and a second preset threshold. The control quota of a traffic control node having a usage rate less than the first preset threshold is lowered, or the control quota of a traffic control node having a usage rate greater than the second preset threshold is increased. As an example, at least one preset threshold may include 30% and 70%. When the usage rate is less than 30%, the control quota of the traffic control node having the usage rate is lowered. When the usage rate is greater than 70%, the control quota of the traffic control node having the usage rate is increased.

After the control quotas are adjusted, the resource control node may generate the updated resource control data according to the resource identifier, the node identifiers of the traffic control nodes in the distributed system and the adjusted control quotas. The resource control node may synchronize the updated resource control data to the at least one traffic control node.

In some alternative implementations of this embodiment, the resource control node may implement the synchronization of the resource control data through the following steps not shown in FIG. 4: dividing the generated resource control data into at least one data block according to a preset data block length; calculating a checksum of a data block in the at least one data block to obtain a first checksum list; sending the first checksum list to the at least one traffic control node, to cause the at least one traffic control node to determine incremental data according to the first checksum list; and sending the incremental data to the at least one traffic control node to complete the synchronization.

In this implementation, the resource control node may divide the generated resource control data into the at least one data block. The length of each data block is equal to the preset data block length. Then, the resource control node may calculate the checksum of the each data block to obtain a checksum list. The checksum list is a list including a plurality of checksums, which is much smaller than the resource control data. Therefore, by sending the checksum list to other traffic control nodes by the resource control node, the efficiency of sending the data is improved. After receiving the checksum list, the other traffic control nodes may determine the incremental data of the resource control node compared with the nodes themselves. The resource control node only needs to send the incremental data to the other traffic control nodes to complete the synchronization. This implementation only needs to send the incremental data to the other traffic control nodes without sending the resource control data to the other traffic control nodes, thereby improving the synchronization efficiency.

It may be understood that the other traffic control nodes may also synchronize the resource control data to other traffic control nodes through this implementation.

According to the method for controlling traffic provided by the above embodiment of the present disclosure, the resource identifier and the corresponding configuration quota may be received first. Then, the first number of the traffic control nodes in the distributed system and the node identifier of the each traffic control node are acquired. Next, according to the configuration quota and the first number, the control quota of the each traffic control node is determined. The resource control data is generated according to the resource identifier, the node identifier of the each traffic control node and the each control quota. Finally, the generated resource control data is synchronized to the at least one traffic control node. According to the method in this embodiment, the traffic control on the resource may be implemented.

Figure 5:
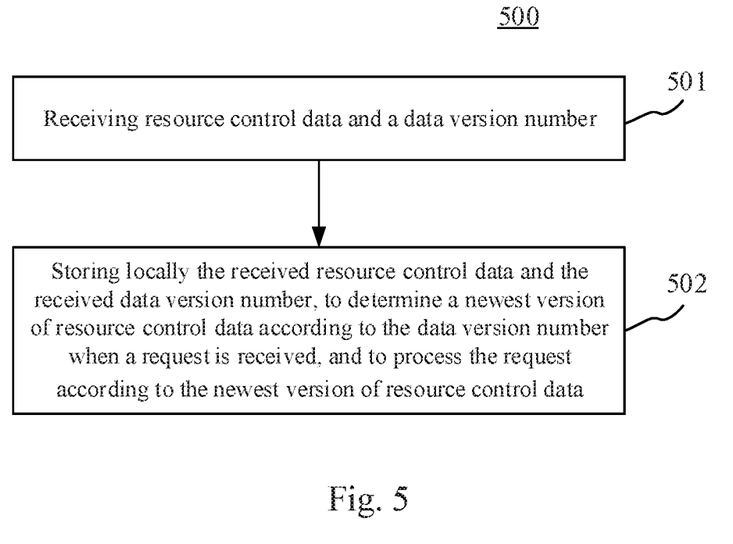
FIG. 5 is a flowchart of the method for controlling traffic according to another embodiment of the present disclosure.

Further referring to FIG. 5, FIG. 5 illustrates a flow 500 of the method for controlling traffic according to another embodiment of the present disclosure. The method for controlling traffic in this embodiment may be applied to a resource control node in a distributed system. The distributed system may include a management node and a plurality of traffic control nodes. Here, the resource control node refers to a node for controlling a resource in the traffic control nodes. This embodiment is described by using the resource control node as a resource user. It may be understood that the method in this embodiment may also be applied to a traffic control node in the distributed system. As shown in FIG. 5, the method for controlling traffic in this embodiment may include the following steps.

Step 501, receiving resource control data and a data version number.

In this embodiment, an executing body (e.g., the resource control node or the traffic control node) of the method for controlling traffic may receive the resource control data and the data version number. The resource control data and the data version number may be sent by the resource control node or by other traffic control nodes. The resource control data may include a resource identifier, node identifiers of the traffic control nodes in the distributed system and control quotas of the traffic control nodes. The data version number may be used to represent the time at which the resource control data is generated, the validity of the resource control data or the like.

Step 502, storing locally the received resource control data and the received data version number, to determine a newest version of resource control data according to the data version number when a request is received, and to process the request according to the newest version of resource control data.

After receiving the resource control data and the data version number, the resource control node may locally store the received information. In this way, when receiving the request, the resource control node may determine the newest version of resource control data according to the data version number, and process the request according to the newest version of resource control data.

In some alternative implementations of this embodiment, taking node A and node B as an example, the node A sends a checksum list to the node B. The node B may implement the reception of the resource control data through the following step not shown in FIG. 5. After the checksum list is received, the checksum may be calculated in a polling mode according to a preset data block length. Here, the data block length that is 128 is taken as an example. The polling specifically means that the node B first calculates the checksum of the data block 0-127. Then, the obtained checksum is matched with each checksum in the checksum list. If the obtained checksum does not match the each checksum in the checksum list, the node B may calculate the checksum of the data block 1-128, and match the obtained checksum with the each checksum in the checksum list again. If the obtained checksum does not match the each checksum in the checksum list, the checksum of the data block 2-129 is calculated . . . until the checksum of a data block (e.g., 100-227) calculated and obtained by the node B matches a checksum in the checksum list. If the obtained checksum matches a checksum in the checksum list, it indicates that the data block (100-227) does not change. Then, the node B continues to calculate the checksum of the data block 228-355, until the end. Therefore, the incremental data between the node B and the node A may be determined. The node B may further calculate the checksum of the above incremental data to obtain the checksum list of the incremental data. Then, the node B sends the checksum list of the incremental data to the node A. The node A may determine the incremental data of node A compared with the node B, based on the checksum list of the incremental data. Finally, the node A sends the incremental data to the node B, to implement the synchronization of the resource control data.

According to the method for controlling traffic provided by the above embodiment of the present disclosure, the traffic may be controlled according to the newest version of resource control data, and at the same time, the data synchronization efficiency between the plurality of traffic control nodes is improved.

Further referring to FIG. 6, as an implementation of the method shown in the above drawings, the present disclosure provides an embodiment of an apparatus for controlling traffic. The embodiment of the apparatus corresponds to the embodiment of the method shown in FIG. 2, and the apparatus may be applied in various electronic devices.

As shown in FIG. 6, the apparatus 600 for controlling traffic in this embodiment is arranged in a management node in a distributed system, the distributed system further including a plurality of traffic control nodes. The apparatus 600 includes a first acquiring unit 601, a control node determining unit 602, a second acquiring unit 603 and a first information sending unit 604.

The first acquiring unit 601 is configured to acquire node identifiers of the plurality of traffic control nodes in the distributed system and a resource identifier of at least one kind of resource controlled by the distributed system.

The control node determining unit 602 is configured to determine, according to the node identifiers and at least one resource identifier, at least one traffic control node for controlling the at least one kind of resource in the distributed system being a resource control node.

The second acquiring unit 603 is configured to acquire a configuration quota of the at least one kind of resource.

The first information sending unit 604 is configured to send at least one configuration quota to a resource control node controlling a corresponding resource, for the resource control node to determine control quotas for the traffic control nodes in the distributed system.

In some alternative implementations of this embodiment, the first acquiring unit 601 may be further configured to: acquire, in response to receiving a node number change message, the node identifiers of the plurality of traffic control nodes in the distributed system.

In some alternative implementations of this embodiment, the apparatus 600 may further include a resource identifier determining unit, a usage quota acquiring unit and a second information sending unit that are not shown in FIG. 6.

The resource identifier determining unit is configured to determine, in response to receiving a load imbalance message, a resource identifier included in the load imbalance message.

The usage quota acquiring unit is configured to acquire usage quotas of the plurality of traffic control nodes in the distributed system for a resource indicated by the determined resource identifier.

The second information sending unit is configured to send the acquired usage quotas to a resource control node controlling the resource indicated by the determined resource identifier, for the resource control node to adjust the control quotas.

According to the apparatus for controlling traffic provided by the above embodiment of the present disclosure, the node identifier of each traffic control node in the distributed system and the resource identifier of each resource may first be acquired. Then, according to the each node identifier and the each resource identifier, it is determined that the each traffic control node for controlling the each resource is the resource control node. Then, the configuration quota of the each resource is acquired. Finally, each configuration quota is sent to each resource control node, for the resource control node to determine a control quota for the each traffic control node in the distributed system. The resource control node may be determined for the each resource, thus implementing the traffic control on various kinds of resources.

It should be understood that the units 601-604 described in the apparatus 600 for controlling traffic correspond to the steps in the method described with reference to FIG. 2, respectively. Therefore, the operations and features described for the method for controlling traffic are also applicable to the apparatus 600 and the units included therein, which will not be repeatedly described here.

Further referring to FIG. 7, FIG. 7 is a schematic structural diagram of the apparatus for controlling traffic according to another embodiment of the present disclosure. As shown in FIG. 7, the apparatus 700 for controlling traffic in this embodiment may be arranged in a resource control node in a distributed system. The distributed system includes a management node and a plurality of traffic control nodes. The resource control node refers to a traffic control node for controlling at least one kind of resource in the plurality of traffic control nodes. The apparatus 700 may include a first receiving unit 701, a third acquiring unit 702, a control quota determining unit 703, a control data generating unit 704 and a control data synchronizing unit 705.

The first receiving unit 701 is configured to receive a resource identifier and a corresponding configuration quota.

The third acquiring unit 702 is configured to acquire a first number of the traffic control nodes in the distributed system and node identifiers of the traffic control nodes.

The control quota determining unit 703 is configured to determine control quotas of the traffic control nodes in the distributed system according to the configuration quota and the first number.

The control data generating unit 704 is configured to generate resource control data according to the resource identifier, the node identifiers of the traffic control nodes in the distributed system and the control quotas.

The control data synchronizing unit 705 is configured to synchronize the generated resource control data to at least one traffic control node.

In some alternative implementations of this embodiment, the apparatus 700 may further include a control quota adjusting unit and a control data updating unit that are not shown in FIG. 7.

The control quota adjusting unit is configured to adjust, in response to receiving usage quotas of the traffic control nodes in the distributed system for a resource, the control quotas of the traffic control nodes in the distributed system according to the received usage quotas and the control quotas of the traffic control nodes.

The control data updating unit is configured to generate updated resource control data according to the resource identifier, the node identifiers of the traffic control nodes in the distributed system and the adjusted control quotas.

In some alternative implementations of this embodiment, the apparatus 700 may further include a version number generating unit not shown in FIG. 7. The version number generating unit is configured to generate a data version number of the resource control data. The control data synchronizing unit 705 may be further configured to synchronize the generated resource control data and the data version number to the at least one traffic control node.

In some alternative implementations of this embodiment, the apparatus 700 may further include a second receiving unit and a storing unit that are not shown in FIG. 7.

The second receiving unit is configured to receive the resource control data and the data version number.

The storing unit is configured to store locally the received resource control data and the received data version number, to determine a newest version of resource control data according to the data version number when a request is received, and to process the request according to the newest version of resource control data.

In some alternative implementations of this embodiment, the control data synchronizing unit 705 may be further configured to: divide the generated resource control data into at least one data block according to a preset data block length; calculate a checksum of a data block in the at least one data block to obtain a checksum list; send the checksum list to the at least one traffic control node, to cause the at least one traffic control node to determine incremental data according to the checksum list; and send the incremental data to the at least one traffic control node to complete the synchronization.

According to the apparatus for controlling traffic provided by the above embodiment of the present disclosure, the resource identifier and the corresponding configuration quota may be received first. Then, the first number of the traffic control nodes in the distributed system and the node identifier of each traffic control node are acquired. Next, according to the configuration quota and the first number, the control quota of the each traffic control node is determined. The resource control data is generated according to the resource identifier, the node identifier of the each traffic control node and the each control quota. Finally, the generated resource control data is synchronized to the at least one traffic control node. According to the apparatus in this embodiment, the traffic control on the resource may be implemented.

It should be understood that the units 701-705 described in the apparatus 700 for controlling traffic correspond to the steps in the method described with reference to FIG. 4, respectively. Therefore, the operations and features described for the method for controlling traffic are also applicable to the apparatus 700 and the units included therein, which will not be repeatedly described here.

Figure 8:
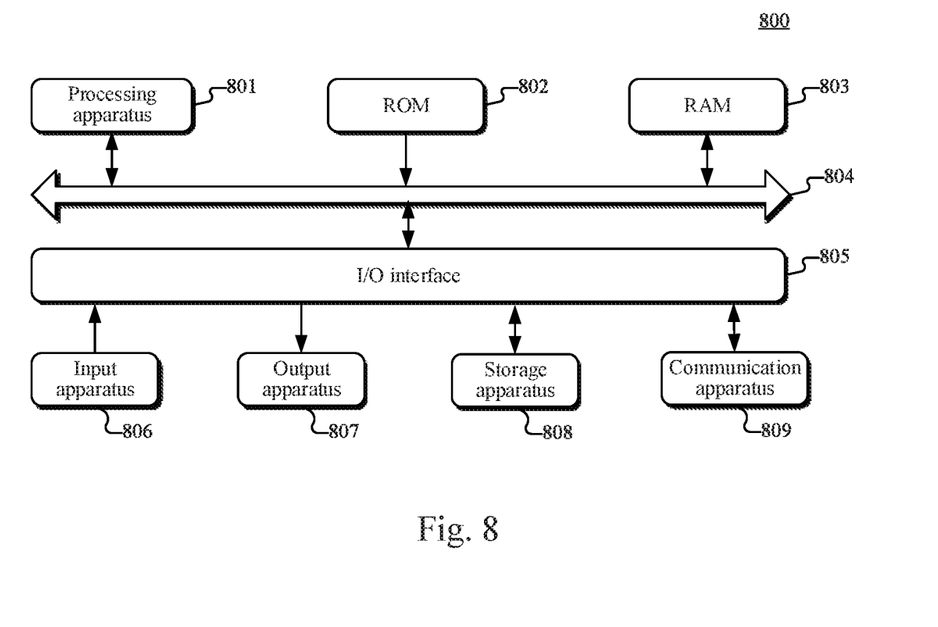
FIG. 8 is a schematic structural diagram of a computer system adapted to implement a server according to embodiments of the present disclosure.

Referring to FIG. 8, FIG. 8 is a schematic structural diagram of an electronic device (e.g., the management node or the traffic control node in FIG. 1) 800 adapted to implement the embodiments of the present disclosure. The electronic device shown in FIG. 8 is merely an example, and should not bring any limitations to the functions and the scope of use of the embodiments of the present disclosure.

As shown in FIG. 8, the electronic device 800 may include a processing apparatus (e.g., a central processing unit and a graphics processing unit) 801, which may execute various appropriate actions and processes in accordance with a program stored in a read-only memory (ROM) 802 or a program loaded into a random access memory (RAM) 803 from a storage apparatus 808. The RAM 803 also stores various programs and data required by operations of the electronic device 800. The processing apparatus 801, the ROM 802 and the RAM 803 are connected to each other through a bus 804. An input/output (I/O) interface 805 is also connected to the bus 804.

The following apparatuses are connected to the I/O interface 805: an input apparatus 806 including, for example, a touch screen, a touch pad, a keyboard, a mouse, a camera, a microphone, an accelerometer and a gyroscope; an output apparatus 807 including, for example, a liquid crystal display (LCD), a speaker and a vibrator; a storage apparatus 808 including, for example, a magnetic tape and a hard disk; and a communication apparatus 809. The communication apparatus 609 may allow the electronic device 800 to exchange data through a wireless communication or a wired communication with other devices. Although FIG. 8 illustrates the electronic device 800 having various apparatuses, it should be understood that it is not required to implement or possess all of the illustrated apparatuses. More or less apparatuses may be alternatively implemented or possessed. Each of the blocks shown in FIG. 8 may represent one apparatus, or may represent a plurality of apparatuses as required.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication apparatus 809, or may be installed from the storage apparatus 808, or may be installed from the ROM 802. The computer program, when executed by the processing apparatus 801, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire node identifiers of a plurality of traffic control nodes in a distributed system and a resource identifier of at least one kind of resource controlled by the distributed system; determine, according to a plurality of node identifiers and at least one resource identifier, at least one traffic control node for controlling the at least one kind of resource in the distributed system being a resource control node; acquire a configuration quota of the at least one kind of resource; and send at least one configuration quota to a resource control node controlling a corresponding resource, for the resource control node to determine control quotas for the traffic control nodes in the distributed system. Alternatively, the one or more programs, when executed by the electronic device, cause the electronic device to: receive a resource identifier and a corresponding configuration quota; acquire a first number of the traffic control nodes in the distributed system and the node identifiers of the traffic control nodes; determine the control quotas of the traffic control nodes in the distributed system according to the configuration quota and the first number; generate resource control data according to the resource identifier, the node identifiers of the traffic control nodes in the distributed system and the control quotas; and synchronize the generated resource control data to at least one traffic control node.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first acquiring unit, a control node determining unit, a second acquiring unit and a first information sending unit. Alternatively, described as: a processor, including a first receiving unit, a third acquiring unit, a control quota determining unit, a control data generating unit and a control data synchronizing unit. Here, the names of these units do not in some cases constitute a limitation to such units themselves. For example, the first acquiring unit may also be described as "a unit configured to acquire node identifiers of the plurality of traffic control nodes in the distributed system and a resource identifier of at least one kind of resource controlled by the distributed system."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling traffic, applied to a management node in a distributed system, the distributed system further comprising a plurality of traffic control nodes, and the method comprising:
   acquiring node identifiers of the plurality of traffic control nodes in the distributed system and a resource identifier of at least one kind of resource controlled by the distributed system;
   determining, according to the node identifiers and the resource identifier, at least one traffic control node for controlling the at least one kind of resource in the distributed system being a resource control node;
   acquiring a configuration quota of the at least one kind of resource; and
   sending the configuration quota to a resource control node controlling a resource corresponding to the configuration quota, for the resource control node to determine control quotas for the traffic control nodes in the distributed system.

2. The method according to claim 1, wherein the acquiring node identifiers of the plurality of traffic control nodes in the distributed system comprises:
   acquiring, in response to receiving a node number change message, the node identifiers of the plurality of traffic control nodes in the distributed system.

3. The method according to claim 1, further comprising:
   determining, in response to receiving a load imbalance message, a resource identifier included in the load imbalance message;
   acquiring usage quotas of the plurality of traffic control nodes in the distributed system for a resource indicated by the determined resource identifier; and
   sending the acquired usage quotas to a resource control node controlling the resource indicated by the determined resource identifier, for the resource control node to adjust the control quotas.

4. A method for controlling traffic, applied to a resource control node in a distributed system, the distributed system comprising a management node and a plurality of traffic control nodes, the resource control node referring to a traffic control node for controlling at least one kind of resource in the plurality of traffic control nodes, and the method comprising:
   receiving a resource identifier and a corresponding configuration quota;
   acquiring a first number of the traffic control nodes in the distributed system and node identifiers of the traffic control nodes;
   determining control quotas of the traffic control nodes in the distributed system according to the configuration quota and the first number;
   generating resource control data according to the resource identifier, the node identifiers of the traffic control nodes in the distributed system and the control quotas; and
   synchronizing the generated resource control data to at least one traffic control node.

5. The method according to claim 4, further comprising:
   adjusting, in response to receiving usage quotas of the traffic control nodes in the distributed system for a resource, the control quotas of the traffic control nodes in the distributed system according to the received usage quotas and the control quotas of the traffic control nodes; and
   generating updated resource control data according to the resource identifier, the node identifiers of the traffic control nodes in the distributed system and the adjusted control quotas.

6. The method according to claim 4, further comprising:
   generating a data version number of the resource control data,
   wherein the synchronizing the generated resource control data to at least one traffic control node comprises:
   synchronizing the generated resource control data and the data version number to the at least one traffic control node.

7. The method according to claim 6, further comprising:
   receiving the resource control data and the data version number; and
   storing locally the received resource control data and the received data version number, to determine a newest version of resource control data according to the data version number when a request is received, and to process the request according to the newest version of resource control data.

8. The method according to claim 4, wherein synchronizing the generated resource control data to the at least one traffic control node comprises:
   dividing the generated resource control data into at least one data block according to a preset data block length;
   calculating a checksum of a data block in the at least one data block to obtain a checksum list;
   sending the checksum list to the at least one traffic control node, to cause the at least one traffic control node to determine incremental data according to the checksum list; and
   sending the incremental data to the at least one traffic control node to complete the synchronization.

9. An apparatus for controlling traffic, arranged in a management node in a distributed system, the distributed system further comprising a plurality of traffic control nodes, and the apparatus comprising:
   at least one processor; and
   a memory storing instructions, wherein the instructions when executed by the at least one processor, cause the at least one processor to perform operations, the operations comprising:
   acquiring node identifiers of the plurality of traffic control nodes in the distributed system and a resource identifier of at least one kind of resource controlled by the distributed system;
   determining, according to the node identifiers and the resource identifier, at least one traffic control node for controlling the at least one kind of resource in the distributed system being a resource control node;
   acquiring a configuration quota of the at least one kind of resource; and
   sending the configuration quota to a resource control node controlling a resource corresponding to the at least one configuration quota, for the resource control node to determine control quotas for the traffic control nodes in the distributed system.

10. The apparatus according to claim 9, wherein the acquiring node identifiers of the plurality of traffic control nodes in the distributed system comprises:
    acquiring, in response to receiving a node number change message, the node identifiers of the plurality of traffic control nodes in the distributed system.

11. The apparatus according to claim 9, wherein the operations further comprise:
    determining, in response to receiving a load imbalance message, a resource identifier included in the load imbalance message;
    acquiring usage quotas of the plurality of traffic control nodes in the distributed system for a resource indicated by the determined resource identifier; and
    sending the acquired usage quotas to a resource control node controlling the resource indicated by the determined resource identifier, for the resource control node to adjust the control quotas.

12. An apparatus for controlling traffic, arranged in a resource control node in a distributed system, the distributed system comprising a management node and a plurality of traffic control nodes, the resource control node referring to a traffic control node for controlling at least one kind of resource in the plurality of traffic control nodes, and the apparatus comprising:
    at least one processor; and
    a memory storing instructions, wherein the instructions when executed by the at least one processor, cause the at least one processor to perform operations, the operations comprising:
    receiving a resource identifier and a corresponding configuration quota;
    acquiring a first number of the traffic control nodes in the distributed system and node identifiers of the traffic control nodes;
    determining control quotas of the traffic control nodes in the distributed system according to the configuration quota and the first number;
    generating resource control data according to the resource identifier, the node identifiers of the traffic control nodes in the distributed system and the control quotas; and
    synchronizing the generated resource control data to at least one traffic control node.

13. The apparatus according to claim 12, wherein the operations further comprise:
    adjusting, in response to receiving usage quotas of the traffic control nodes in the distributed system for a resource, the control quotas of the traffic control nodes in the distributed system according to the received usage quotas and the control quotas of the traffic control nodes; and generating updated resource control data according to the resource identifier, the node identifiers of the traffic control nodes in the distributed system and the adjusted control quotas.

14. The apparatus according to claim 12, wherein the operations further comprise:

generating a data version number of the resource control data, wherein the synchronizing the generated resource control data to at least one traffic control node comprises:

synchronizing the generated resource control data and the data version number to the at least one traffic control node.

15. The apparatus according to claim 14, wherein the operations further comprise:

receiving the resource control data and the data version number; and storing locally the received resource control data and the received data version number, to determine a newest version of resource control data according to the data version number when a request is received, and to process the request according to the newest version of resource control data.

16. The apparatus according to claim 12, wherein synchronizing the generated resource control data to the at least one traffic control node comprises:

dividing the generated resource control data into at least one data block according to a preset data block length;

calculating a checksum of a data block in the at least one data block to obtain a checksum list;

sending the checksum list to the at least one traffic control node, to cause the at least one traffic control node to determine incremental data according to the checksum list; and sending the incremental data to the at least one traffic control node to complete the synchronization.

17. A server, comprising:

one or more processors; and a storage apparatus, configured to store one or more programs, wherein the one or more programs, when executed by the one or more processors, cause the one or more processors to implement the method according to claim 1.

18. A server, comprising:

one or more processors; and a storage apparatus, configured to store one or more programs, wherein the one or more programs, when executed by the one or more processors, cause the one or more processors to implement the method according to claim 4.

19. A non-transitory computer readable medium, storing a computer program, wherein the program, when executed by a processor, implements the method according to claim 1.

20. A non-transitory computer readable medium, storing a computer program, wherein the program, when executed by a processor, implements the method according to claim 4.

* * * * *